United States Patent [19]
Kosik et al.

[11] Patent Number: 6,086,508
[45] Date of Patent: Jul. 11, 2000

[54] AUTOMATIC CLUTCH

[75] Inventors: Franz Kosik, Ostfildern; Thomas Grass, Urbach, both of Germany

[73] Assignee: DaimlerChrysler AG, Stuttgart, Germany

[21] Appl. No.: 09/269,276

[22] PCT Filed: Sep. 18, 1997

[86] PCT No.: PCT/DE97/02145

§ 371 Date: Mar. 25, 1999

§ 102(e) Date: Mar. 25, 1999

[87] PCT Pub. No.: WO98/13616

PCT Pub. Date: Apr. 2, 1998

[30] Foreign Application Priority Data

Sep. 25, 1996 [DE] Germany .................... 196 39 322

[51] Int. Cl.$^7$ .................... F16D 48/06; B60K 41/02
[52] U.S. Cl. .................................... 477/74; 477/171
[58] Field of Search ........................ 477/74, 171

[56] References Cited

U.S. PATENT DOCUMENTS 5,632,706  5/1997  Kremmling et al. .
5,700,227  12/1997  Kosik et al. ............... 477/171
5,916,061  6/1999  Koyama et al. ............ 477/171
5,941,792  8/1999  Amendt et al. .............. 477/74

FOREIGN PATENT DOCUMENTS

| 1-115742 | 5/1989 | Japan . |
| 6-159397 | 6/1994 | Japan . |
| 2 163 511 | 2/1986 | United Kingdom . |
| 2 245 042 | 12/1991 | United Kingdom . |
| WO 96/00844 | 1/1996 | WIPO . |

*Primary Examiner*—Dirk Wright
*Attorney, Agent, or Firm*—Evenson, McKeown, Edwards & Lenahan, PLLC

[57] ABSTRACT

The invention concerns an automatic clutch in a motor vehicle drive train with a manually operated gearshift. If an accelerator pedal or the like used to control the engine and a vehicle service brake are not activated, the clutch is set at a creeping moment when a gear is engaged and the engine is running. When the service brake is actuated, this creeping moment is maintained for a predetermined time interval, decreased or suppressed in a time-delayed manner.

7 Claims, 1 Drawing Sheet

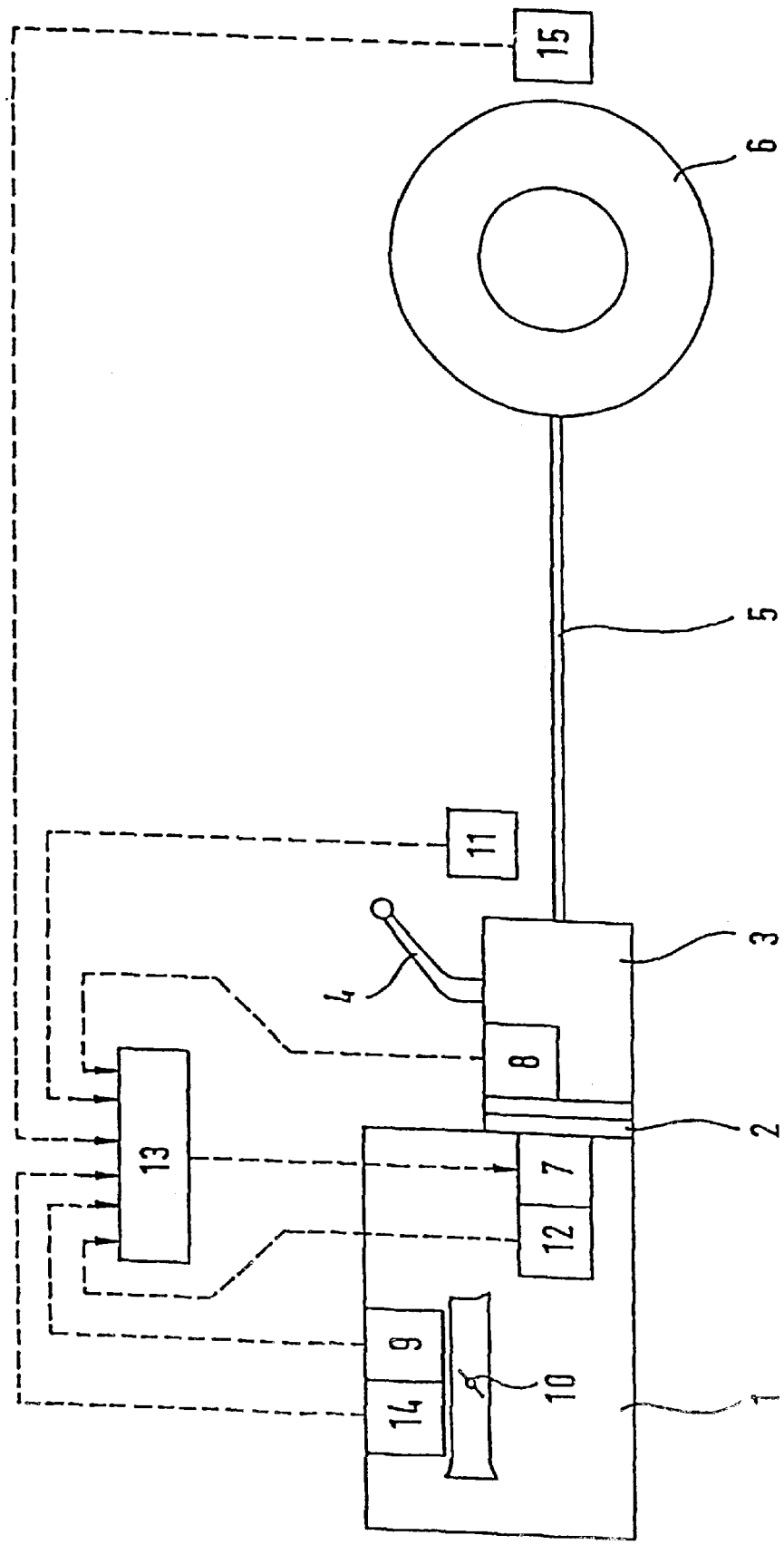

AUTOMATIC CLUTCH

The invention concerns an automatic clutch in the drive train of a motor vehicle, having a transmission which is manually shifted between different drive positions or gears, having an adjusting unit which automatically actuates the clutch and having a system of sensors which serves for controlling said adjusting unit, senses (inter alia) driver actuation of a vehicle brake, driver actuation of a control element (e.g. throttle valve) of the engine as well as an activated state of a drive position and sets the clutch to a creeping moment if, with the engine running and the drive position selected, the vehicle brake and the control element of the engine are unactuated, or releases the clutch if the vehicle brake remains actuated and the control element is not actuated.

In the case of motor vehicles with customary internal combustion engines, a transmission must be arranged in the drive train to allow the transmission ratio between the speed of the vehicle engine and the speed of the drive wheels to be changed according to the respective travelling speed and loading of the vehicle. In the case of customary transmissions, during a change of drive position the power flow between engine and drive wheels has to be interrupted by releasing a clutch.

It is known in principle to use automatic clutches for this purpose, i.e. the clutch is automatically released when changing a transmission stage and is subsequently re-engaged.

To make maneuvering operations easier, it is known in principle to set the automatic clutch to a light transmissible torque, i.e. a creeping moment, when a transmission stage has been selected, the engine is running and neither the service brake of the vehicle nor a gas pedal serving for controlling the power of the engine, or the like, are actuated. This makes use of the fact that the engines of motor vehicles nowadays usually have an effective automatic engine control which is able to keep the engine at a minimum speed, generally at the so-called idling speed, when the gas pedal is unactuated, to be precise even if the engine is loaded to varying degrees. On the basis of the transmission of a creeping moment by the clutch envisaged in this case, the vehicle can start creeping forward or perform a creeping movement, as is desired for maneuvering operations.

According to PATENTS ABSTRACTS OF JAPAN, M-857 Jul. 31, 1989, Vol. 13/No. 340, it is known from JP 1-115742 (A) to release the automatic clutch fully after a predetermined time interval in the creeping phase described above.

According to PATENTS ABSTRACTS OF JAPAN, M-1672 Sep. 13, 1994, Vol. 18/No. 491, JP 6-159397 (A) shows in this connection that the creeping moment is to be automatically controlled in a way in which the speed of the vehicle engine does not go below a minimum speed.

The object of the invention is thus to improve further the clutch control in maneuvering operations.

This object is achieved according to the invention by the clutch moment being slowly reduced when the brake is actuated and the control element is unactuated.

The invention is based on the general idea that in driving maneuvres with the gas pedal or the like not actuated, in the event of the brake being actuated the clutch can still transmit a certain torque, which is small in comparison with the achievable braking forces and is also reduced sooner or later with respect to the creeping moment transmitted when the brake is not actuated and when the gas pedal is unactuated, or brought to diminishing values. This ensures that the driver can initially control the travelling speed against the creeping tendency of the vehicle by actuating the brake with varying force. At the same time, it is ensured that undesired overloading of the clutch is avoided.

A particular advantage of the invention is that, if the brake is actuated only for a short time during a creeping maneuvre, a torque is constantly transmitted by the clutch and, when actuation of the brake is ended, is available without delay in reproducible intensity, without complex control measures being necessary for this.

Otherwise, with regard to advantageous features of the invention, reference is made to the claims and the following explanation of the drawing, on the basis of which particularly preferred embodiments are described.

In the drawing, the single FIGURE shows a schematized representation of a drive train of a motor vehicle as well as the components essential for the clutch control.

An internal combustion engine 1 is connected in drive terms via an automatically actuated clutch 2 and a transmission 3, the drive positions or gears of which are changed by manual actuation of a shift lever 4, and a drive shaft 5, for example a cardan shaft, to drive wheels 6 of a motor vehicle, otherwise not represented in any more detail.

The actuation of the clutch 2 takes place automatically by means of a motorized adjusting unit 7, for the control of which a system of sensors is provided for monitoring various parameters of driving operation.

This system of sensors comprises a sensor arrangement 8, which is assigned to the transmission 3 or the shift lever 4 and senses the positions and/or movements of the latter and consequently "knows" the respectively selected drive position or the respectively engaged gear. Also provided is a sensor 9 which senses the position of an element serving for controlling the power of the engine 1, for example a throttle valve 10 of the air intake system of the engine 1, or a gas pedal (not shown) actuating the throttle valve.

Furthermore, the system of sensors comprises a signalling device 11, which monitors the actuation of a vehicle brake (not shown). This signalling device 11 may be formed by a brake light switch, which is positively actuated on actuation of the vehicle brake for switching on the brake lights, for example by a driver-actuated brake pedal (not shown).

Finally, the system of sensors comprises a displacement pickup 12, which is assigned to the adjusting unit 7 and senses the position of the latter, and consequently a parameter which is analogous to the value of the torque which can be transmitted by the automatic clutch 2.

The signals of the sensor arrangement 8, of the sensor 9, of the signalling device 11 and of the displacement pickup 12 are processed by a control circuit 13, which controls the adjusting unit 7. The control circuit 13 also preferably communicates with an engine control 14, which has the task, inter alia, of keeping the engine speed at a minimum speed, for instance the idling speed, to the greatest extent independently of the loading of the engine. The engine control 14 also "knows" the torque respectively generated by the engine. The control circuit 13 otherwise communicates with speed pickups 15, which are assigned to the vehicle wheels. Consequently, the control circuit 13 can also "detect" the state of movement of the vehicle.

On the basis of the exchange of information with the engine control 14, the control circuit 13 can also determine the moment transmitted in each case by the clutch 2 in dependence on the position of the adjusting unit 7. At constant travelling speed, the following applies for the moment $M_K$ which can be transmitted by the clutch 2:

$$M_K = M_{Mot} - J_{Mot} d\omega_{Mot}/dt,$$

where $M_{Mot}$ is the torque generated by the engine 1, which is detected by the engine control 14, $J_{Mot}$ is the moment of inertia of the engine 1, which is predetermined by the design of the engine 1, and $\omega_{Mot}$ is the speed of the engine. t denotes time.

Since all engine-related variables can be sensed by the engine control 14 and it can be detected from the signals of the speed pickups 15 whether the vehicle is travelling at approximately constant speed, the control circuit 13 knows on the basis of its interaction with the engine control 14 and the speed pickups 15 the respective clutch moment $M_K$. In addition, the control circuit 13 knows from the signals of the displacement pickup 12 the position of the adjusting unit 7, so that the proportionality between the clutch moment $M_K$ and the travel of the adjusting unit 7 can also be determined for the control circuit 13. As a result, the control circuit 13 thus knows the transmissible moment respectively set at the clutch 2.

If the throttle valve 10 or a gas pedal controlling the throttle valve 10 assumes its rest position, i.e. the gas pedal is not actuated, and if furthermore the signalling device 11 does not generate a braking signal, i.e. the vehicle brake is not actuated, the control circuit 13 controls the adjusting unit 7 in such a way that the clutch 2 is able to transmit a predetermined creeping moment of, for example, 30 Nm. Consequently, the vehicle has a creeping tendency advantageous for maneuvering operations.

If the vehicle brake is then actuated, according to a first embodiment of the invention the setting of the clutch 2 remains unchanged for a predetermined delay time. Thereafter, if the brake continues to remain actuated, the clutch moment is reduced, i.e. the clutch is released.

According to a second advantageous embodiment of the invention, when the vehicle brake is actuated the clutch moment can be initially reduced with respect to the creeping moment, for example to a value which corresponds approximately to one third of the creeping moment. This reduced transmissible moment is left unchanged for a predetermined time interval if the vehicle brake continues to remain actuated. Thereafter, the clutch moment can be increasingly reduced.

Instead of this, it is also possible when the vehicle brake is actuated to reduce the clutch moment continuously according to a predetermined ramp, so that if the brake remains actuated the clutch moment is slowly reduced until a fully released state of the clutch 2 is reached.

What is claimed is:

1. An automatic clutch in a drive train of a motor vehicle, said drive train having a transmission which is manually shifted between different drive positions or transmission stages, an adjusting unit which automatically actuates the clutch and a system of sensors which serves for controlling said adjusting unit, the system sensing at least driver actuation of a vehicle brake, driver actuation of an engine control element as well as an activated state of a drive position or transmission stage, wherein the adjusting unit sets the clutch to a creeping moment if, with the engine running, the vehicle brake and the control element are unactuated, or releases the clutch if the vehicle brake remains actuated and the control element is not actuated, and further wherein, when the vehicle brake is actuated, the clutch moment is reduced continuously according to a predetermined ramp, so that if the brake remains actuated the clutch moment is slowly reduced until a fully released state of the clutch is reached.

2. The clutch as claimed in claim 1, wherein when the brake is actuated and the control element is not actuated the creeping moment or a clutch moment reduced with respect to the creeping moment remains set or, with the brake remaining actuated, is continuously reduced after a predetermined holding time.

3. The clutch as claimed in claim 2, wherein the reduced clutch moment is slowly set when the brake is actuated and the control element of the engine is unactuated.

4. The automatic clutch according to claim 1, wherein the engine control element is a throttle valve.

5. The automatic clutch according to claim 2, wherein the predetermined holding time is between 3–5 seconds.

6. The clutch according to claim 1, wherein a signal generated by a brake light switch is sensed to detect brake actuation.

7. A method of operating an automatic clutch in a drive train of a motor vehicle having a manually operated gear shift, the method comprising the acts of:

sensing driver actuation of a vehicle brake;

sensing driver actuation of a control element of an engine;

sensing an activated state of a gear position of the manually operated gear shift;

setting the automatic clutch to a creeping moment if, with a running engine, the vehicle brake and the control element are unactuated;

releasing the automatic clutch if the vehicle brake remains actuated and the control element is not actuated; and when the vehicle brake is actuated continuously, reducing the clutch moment according to a predetermined ramp so that if the brake remains actuated, the clutch moment is slowly reduced until a fully released state of the clutch is reached.

* * * * *